United States Patent
Fais et al.

(10) Patent No.: US 10,532,699 B2
(45) Date of Patent: Jan. 14, 2020

(54) MAGNETIC QUICK MOUNTING UNIT FOR CONSTRUCTION MACHINES, METHOD, AND CONSTRUCTION MACHINE HAVING SUCH A QUICK MOUNTING UNIT

(71) Applicant: BOMAG GmbH, Boppard (DE)

(72) Inventors: Giuseppe Fais, Formigine (IT); Riccardo Zaniboni, Ravenna (IT)

(73) Assignee: BOMAG GmbH, Boppard (DE)

( * ) Notice: Subject to any disclaimer, the term of this patent is extended or adjusted under 35 U.S.C. 154(b) by 274 days.

(21) Appl. No.: 15/384,654

(22) Filed: Dec. 20, 2016

(65) Prior Publication Data

US 2017/0182954 A1 Jun. 29, 2017

(30) Foreign Application Priority Data

Dec. 23, 2015 (DE) .................. 10 2015 016 776
Mar. 23, 2016 (DE) .................. 10 2016 003 674

(51) Int. Cl.
*B60R 11/04* (2006.01)
*B60K 35/00* (2006.01)
(Continued)

(52) U.S. Cl.
CPC .............. *B60R 11/04* (2013.01); *B60K 35/00* (2013.01); *B60R 1/00* (2013.01); *F16B 1/00* (2013.01);
(Continued)

(58) Field of Classification Search
None
See application file for complete search history.

(56) References Cited

U.S. PATENT DOCUMENTS 6,042,080 A 3/2000 Shepherd et al.
8,137,008 B1 3/2012 Mallano
(Continued)

FOREIGN PATENT DOCUMENTS

CN 201296213 Y 8/2009
CN 104080653 A 10/2014
(Continued)

OTHER PUBLICATIONS

Chinese Patent Office, Office Action, Application No. 201611273118.7, dated Sep. 7, 2018 (4 pages).

*Primary Examiner* — Mohammed S Rahaman
(74) *Attorney, Agent, or Firm* — Wood Herron & Evans LLP

(57) ABSTRACT

The present invention relates to a magnetic quick mounting unit for construction machines, particularly road pavers, having a positioning mark configured for permanent attachment to a construction machine, an attachment device which can be magnetically attached on the positioning mark, an alignment mark arranged on the attachment device and indicating the alignment of the attachment device, and an alignment aid arranged on the positioning mark, the alignment mark and the alignment aid being configured such that the alignment of the attachment device relative to the construction machine can be read from the relative position of the alignment mark to the alignment aid when the attachment device has been attached on the positioning mark. The present invention further relates to a method for magnetic quick-mounting of an attachment device, particularly a camera, to a construction machine, particularly a road paver, comprising the steps of: attaching a positioning mark with an alignment aid on the construction machine; attaching an alignment mark on the attachment device; magnetically attaching the attachment device on the positioning mark; and aligning the attachment device by means of the (Continued)

relative positions of the alignment aid and the alignment mark. Furthermore, the present invention relates to a construction machine having such a magnetic quick mounting unit.

18 Claims, 8 Drawing Sheets

(51) Int. Cl.
*B60R 1/00* (2006.01)
*F16B 1/00* (2006.01)
*F16M 13/02* (2006.01)
*H04N 7/18* (2006.01)
*B60R 11/00* (2006.01)

(52) U.S. Cl.
CPC .......... *F16M 13/022* (2013.01); *H04N 7/183* (2013.01); *B60K 2370/152* (2019.05); *B60K 2370/21* (2019.05); *B60K 2370/797* (2019.05); *B60K 2370/80* (2019.05); *B60R 2011/004* (2013.01); *B60R 2011/0042* (2013.01); *B60R 2300/105* (2013.01); *B60R 2300/8086* (2013.01); *B60Y 2200/413* (2013.01); *B60Y 2200/414* (2013.01); *B60Y 2400/92* (2013.01); *F16B 2001/0035* (2013.01)

(56) References Cited

U.S. PATENT DOCUMENTS

| | | |
|---|---|---|
| 9,221,397 B1 | 12/2015 | Kim et al. |
| 9,357,044 B1* | 5/2016 | Scully .................... F16M 13/02 |
| 2004/0017060 A1* | 1/2004 | Kinnard .................. B60D 1/36 |
| | | 280/477 |
| 2013/0080000 A1 | 3/2013 | Von der Lippe et al. |
| 2013/0190981 A1* | 7/2013 | Dolinar .................. B60R 11/04 |
| | | 701/41 |
| 2014/0191096 A1 | 7/2014 | Wiercinski et al. |
| 2016/0003270 A1* | 1/2016 | Franklin ................... F16B 1/00 |
| | | 439/529 |

FOREIGN PATENT DOCUMENTS

| | | |
|---|---|---|
| CN | 204805899 U | 11/2015 |
| DE | 202006014797 U1 | 2/2008 |

* cited by examiner

Fig. 1
Fig. 2
Fig. 3
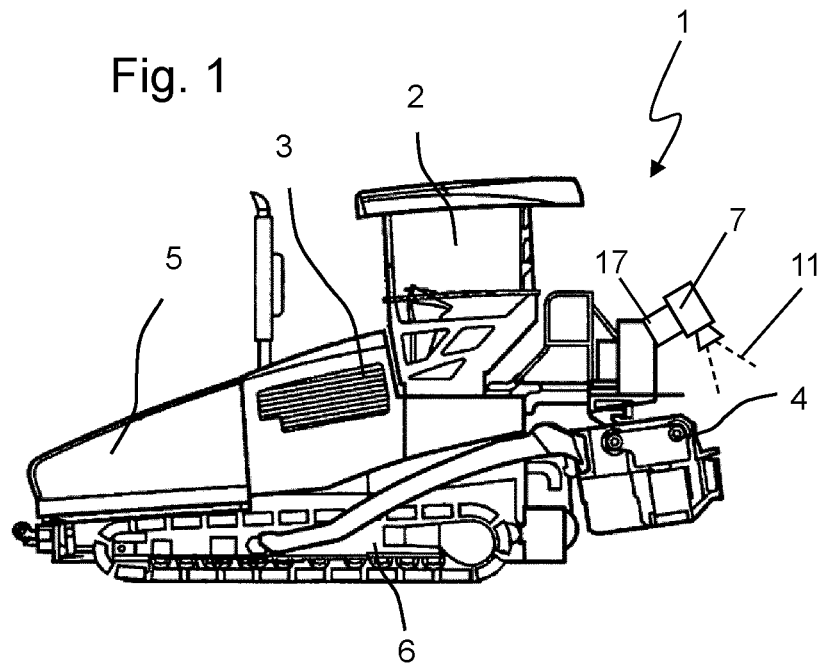
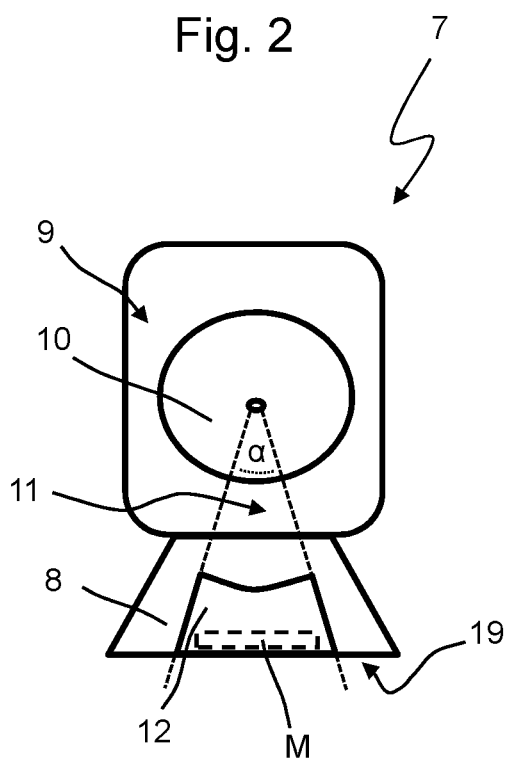
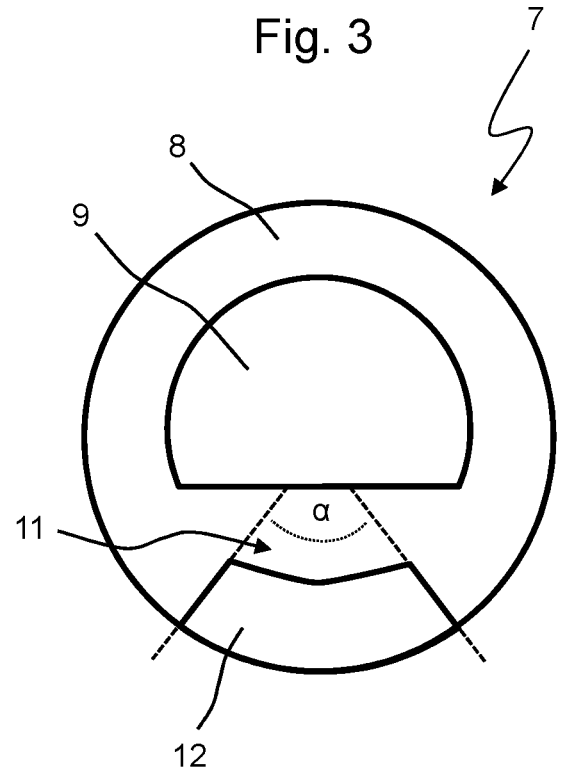

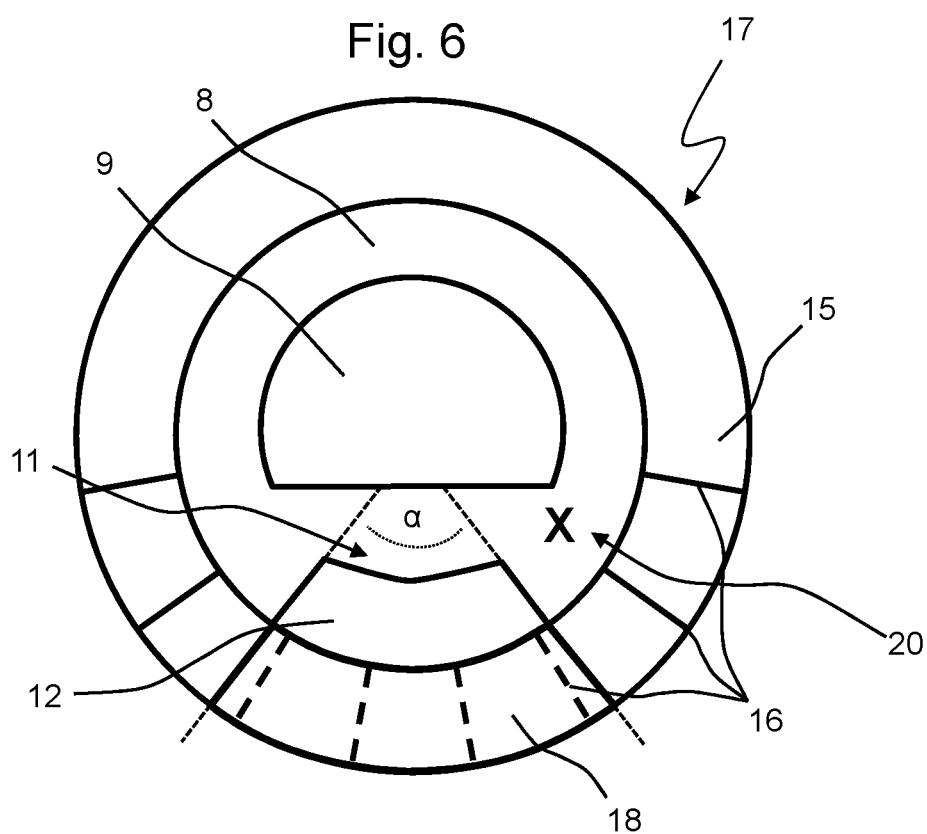
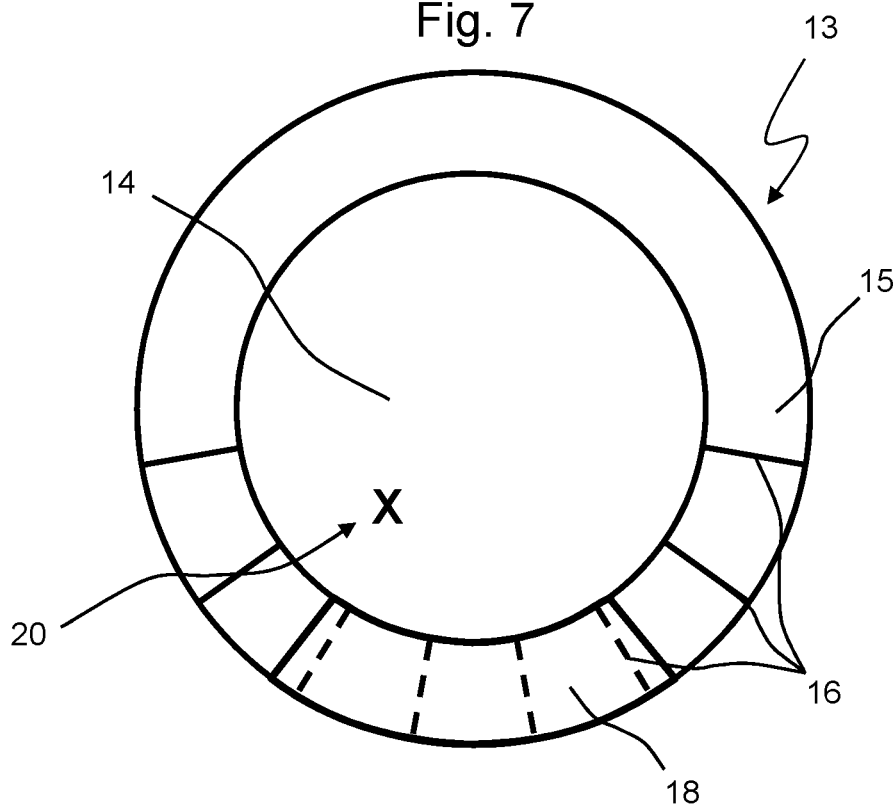

MAGNETIC QUICK MOUNTING UNIT FOR CONSTRUCTION MACHINES, METHOD, AND CONSTRUCTION MACHINE HAVING SUCH A QUICK MOUNTING UNIT

CROSS-REFERENCE TO RELATED APPLICATIONS

The present application claims priority under 35 U.S.C. § 119 of German Patent Application No. 10 2015 016 776.6, filed Dec. 23, 2015 and German Patent Application No. 10 2016 003 674.5, filed Mar. 23, 2016, the disclosures of which are hereby incorporated herein by reference in their entireties.

FIELD OF THE INVENTION

The present invention relates to a magnetic quick mounting unit for constructions machines, particularly road pavers. The present invention further relates to a method for the magnetic quick-mounting of an attachment device to a construction machine and a construction machine having such a magnetic quick mounting unit.

BACKGROUND OF THE INVENTION

When operating construction machines, attachment devices are often used that are mounted to the outside of the machines. In other words, the attachment devices are applied to the construction machines in such a manner that they are accessible from outside the construction machine. In this case, construction machines refer particularly to road construction machinery, such as road pavers, road milling machines, stabilizers, recyclers, and road rollers or other soil compacting machines, e.g., landfill compactors. For example, sensors that serve to increase operational safety and/or to improve precision in control are considered to be attachment devices. For example, cameras are used as attachment devices particularly with road pavers and road milling machines in order to enable the driver to have optimum visibility of the paving or milling process.

These attachment devices are typically relatively expensive and/or prone to vandalism. Therefore, it is often necessary to remove them from the construction machine at the end of a workday and to reattach them once again the next workday so that the attachment devices cannot be damaged overnight or even stolen. Widespread use of these attachment devices is also frequently not required, so it is not always necessary to equip every machine with respective attachment devices. Thus, it is viewed as an advantage if one and the same attachment device can also be used on different machines on an alternating basis.

Until now, the attachments devices, particularly cameras, have been mounted, for example, by means of screw connections. These enable reliable mounting of the attachment device. However, it takes a relatively long time to remove the attachment device at the end of the workday, which creates the hazard that the operator just leaves the attachment device on the construction machine, which leads to the above-described risks. Moreover, the attachment devices can only be attached where there are corresponding screw holes and/or sockets on the construction machine for accommodating the attachment device.

To simplify and speed up the installation or removal of the camera, attachment devices having magnetic brackets are used. They have the added benefit that they do not require a socket on the construction machine and therefore can be mounted anywhere depending on where they are intended to be used. However, the disadvantage of the known magnetic mountings is that, while they can be quickly mounted anywhere on the construction machine, it is time-consuming to adjust the attachment device to the desired orientation. In particular, this relates to the use of cameras as attachment devices, which are normally to be mounted on the construction machine with a defined angle of view. The adjustment of the camera constitutes a relatively time-consuming task. By contrast, the orientation of the attachment device is predetermined in the case of screw connections by the position of the screws holes. This type of constant alignment is lacking with magnetic mountings, which can be used anywhere on the construction machine. The correct orientation of the attachment device must be freely adjusted by hand. Thus, effort that was saved as a result of the quick installation is in turn at least partially wasted on the time-consuming adjustment or alignment. This is particularly the case if an exact alignment of the attachment device, particularly the camera, is important, for example, if the camera is used as a sensor device to simplify the loading of milled material (as disclosed in US 2013/0080000 A1), or if other image processing steps occur.

SUMMARY OF THE INVENTION

It is therefore the object of the present invention to provide an installation option for attachment devices for construction machines, which, on one the hand, provides for quick attachment and removal of the attachment device on the construction machine and, on the other hand, enables a quick, reliable, and precise alignment of the attachment device with respect to the construction machine.

Specifically, the object is achieved with a magnetic quick mounting unit for construction machines, particularly road pavers and road milling machines, having a positioning mark configured for permanent attachment to a construction machine, an attachment device that can be magnetically mounted to said positioning mark, an alignment mark arranged on said attachment device and indicating the alignment of the attachment device, and an alignment aid arranged on said positioning mark, said alignment mark and said alignment aid being configured such that the alignment of the attachment device with respect to the construction machine can be read from the orientation of the alignment mark relative to the alignment aid when the attachment device is mounted on the positioning mark. In this regard, permanent means that the positioning mark is to remain on the machine regardless of whether or not the attachment device is mounted.

The magnetic quick mounting unit may comprise magnetic and non-magnetic components. Thus, for example, the positioning mark may be magnetically or non-magnetically attached or mounted to the construction machine. What is important is that the attachment device can be reversibly mounted on the machine directly or indirectly via a connection caused by magnetism. Accordingly, the magnetic quick mounting unit itself preferably comprises a retention magnet as well, through which the connection to the construction machine is achieved.

The positioning mark serves to identify that position on the construction machine to which the attachment device is to be mounted. Thus, a user can always attach the attachment device at the same spot without spending much time thinking about the exact positioning or, in the worst case, having to find it by trial and error. In the present context, a permanent attachment also means, in particular, that the position of the attached mark will not change even while the construction machine is in operation and that the positioning mark is configured such that, once mounted to the construction machine, it can remain thereon for at least days or even permanently.

According to one embodiment of the present invention, an alignment mark is provided on the attachment device and an alignment aid is provided on the positioning mark. The alignment mark serves to provide a visual marking of the alignment or the operational direction of the attachment device. Since most attachment devices such as cameras have a direction in which they fulfill their functionality (for example, the line of sight of a camera or the measuring direction of a sensor), this must be taken into account during installation of the attachment device in order to ensure that an identical relative positioning of the attachment device on the construction machine is achieved after repeated removal and installation. To ensure the correct alignment of the attachment device with respect to the construction machine, the alignment aid on the positioning mark is used. This provides a fixed point on the construction machine with which the alignment mark—and therefore the attachment device—can be adjusted or aligned. Overall, the alignment of the attachment device is apparent in joint consideration of the alignment mark and the alignment aid, or from their position relative to each other. The alignment mark and the alignment aid are preferably configured such that they are visible for an operator when the attachment device has been mounted to the construction machine; the alignment aid is thus ideally not covered, for example, by the attachment device. This is achieved, for example, by the positioning mark being larger than the area covered by the attachment device when mounted to the construction machine. The part of the positioning mark having the alignment aid preferably protrudes beyond the attachment device mounted to the construction machine and is therefore visible. Thus, the operator can still read and, if necessary, correct the alignment of the attachment device even after the attachment device has been initially attached. Consequently, one embodiment of the present invention consists in providing a positioning aid for a magnetic quick mounting unit, to which end, on the one hand, a mark is provided on the construction machine (positioning mark) and a mark is also provided on the attachment device (directly or indirectly; alignment mark). In order to ensure that the attachment device is not only attached at the same spot on the construction machine, but also with the same alignment, an alignment mark (alignment aid) is provided on the positioning mark according to one embodiment of the present invention, which encodes a respective alignment of the attachment device for installation. The magnetic quick mounting unit according to the present invention thus enables attachment of an attachment device to one and the same spot on the construction machine with one and the same alignment. This simplifies attachment and removal substantially, which also significantly increases compliance on the part of the operators with regard to actually removing the attachment device from the construction machine after operation and mounting it before operation.

In principle, it is sufficient to provide a single point, a line or a similar mark as an alignment aid on the positioning mark. With this mark, the attachment device can be aligned with the help of the alignment mark. It is, however, preferred if the alignment aid has a scale by means of which the attachment device can be adjusted to different alignments when being mounted. The scale is preferably configured such that it provides levels, particularly uniformly spaced levels, in which the operational direction of the attachment device can be adjusted. Of course, the operational direction of the attachment device can principally be adjusted continuously—the levels merely arise because the scale of the alignment aid identifies different positions which respectively correspond to one level. For example, the scale can be configured such that an adjustment of the attachment device by one level corresponds to rotation of the attachment device by a maximum of 20°, preferably a maximum of 15°, more preferably a maximum of 10°, and particularly preferably by a maximum of 5°. Such "rotation" occurs preferably about a virtual axis which sticks out perpendicularly from the mounting surface of the construction machine. An alignment of the alignment mark with these levels then results in an alignment of the attachment device relative to the construction machine corresponding to the respective level. In this manner, it is particularly easy to adjust different alignments of an attachment device to a positioning mark or to adapt the alignment in steps which correspond to the levels. The special advantage also lies in the fact that, due to the scale, the respective alignments can be easily and quickly reproduced after having been changed or if the attachment device was removed from the construction machine.

For most applications, it is sufficient if the alignment aid and particularly its scale are only present in an area of the circumference of the attachment device mounted to the construction machine, as with cameras, for example, it rarely occurs that they can actually be sensibly used in all directions at a given position. Nevertheless, the flexibility of the magnetic quick mounting unit is increased if the alignment aid and particularly its scale enable a plurality of possible alignments of the attachment device. Thus, it is preferred that the alignment aid surrounds the circumference of the attachment device mounted to the positioning mark by at least one-third, preferably by at least the half, more preferably by at least two-thirds, and particularly preferably completely. In particular, the alignment aid has the scale across its entire extension, such that the attachment device can be precisely and simply aligned to a positioning mark over a range of up to 360°.

It occasionally occurs that the alignment of the attachment device needs to be temporarily changed for individual work steps and returned to the original position following the work step. In addition, if the attachment device is removed at the end of the workday, it should be possible to reattach and realign it the next workday exactly as it was the day before. To achieve this, it is preferred that the magnetic quick mounting unit comprises a reference mark which can be detachably attached to the alignment aid and with which a desired alignment of the attachment device relative to the construction machine can be marked. The reference mark may particularly be attachable to the positioning mark magnetically or with adhesive or clamps. A snap or plug connection with the positioning mark is also possible. Particularly preferred is a magnetic connection which can be achieved by the reference mark comprising a magnet with which it can be attached either to the positioning mark or to the construction machine below the positioning mark. The reference mark is mounted to the alignment aid of the positioning mark in such a manner, for example, that it displays the position of the alignment mark of the attachment device even if the attachment device is removed together with the alignment mark or its alignment has been changed. If the attachment device is to be returned to the respective alignment, the alignment mark is simply aligned based on the reference mark. In this manner, the original alignment of the attachment device to the construction machine can be restored in an easy, quick and precise manner.

To further simplify and speed up the mounting of the attachment device to the construction machine, particularly if multiple attachment devices are to be used on one construction machine and/or multiple alignments for one and the same attachment device, it is preferable if the attachment device and the positioning mark have an allocation aid, which enables the allocation of the attachment device to the positioning mark. Thus, for the user, a clear allocation of a specific attachment device to a positioning mark and/or a specific alignment of the attachment device to the positioning mark are possible with the allocation aid. For example, both the attachment device and the positioning mark have a corresponding symbol or a corresponding number. However, the allocation aid may also be detachable such that it can be attached respectively to the attachment device and the positioning mark. The detachable connection of the allocation aid with the attachment device and the positioning mark may likewise occur, for example, magnetically, by means of clamping, adhesion, snapping or plugging. Depending on the application, this makes it possible to allocate the attachment devices to the respective positioning marks. In this manner, an attachment device which is to be attached to a particular positioning mark can be clearly allocated to said positioning mark without much consideration. This is particularly advantageous when multiple and/or different attachment devices are used.

As previously described, the present invention provides a magnetic quick mounting unit which can principally be used with all, particularly valuable, attachment devices for construction machines. However, it is preferred that the attachment device is a sensor, particularly a camera. In addition to cameras, other sensors, such as laser sensors or ultrasonic sensors, etc. are also possible. Especially with sensors, the advantages of the present invention, i.e., a precisely adjustable and reproducible alignment, become particularly apparent. The present invention relates particularly preferably to a magnetic quick mounting unit for a camera for a road paver and/or road-milling machine.

The positioning mark and/or the alignment mark can principally be achieved in various manners. For example, the respective mark can be applied with a permanent marker or color or even a spatial structure. Attachment of a molded marking part by means of screws or a clamp, snap or plug connection is also possible. The positioning mark and/or the alignment mark are preferably configured as, particularly weatherproof, stickers. In the present case, weatherproof means that the sticker is configured particularly resistant to heat, cold, light, water, abrasion, and smearing and ideally can withstand outdoors for several years without losing its functionality. That is, it will not come loose or lose its markings or the scale of the alignment aid. The configuration of the positioning mark and/or the alignment mark as stickers is inexpensive and enables a particularly simple and quick as well as an extremely multifaceted attachment to the construction machine or the attachment device. In addition, existing magnetic attachment devices can be easily retrofitted in this manner for the quick mounting unit according to the present invention. Furthermore, for example, the attachment device can then be applied to the sticker as well.

It is additionally preferred if the quick mounting unit has a foot and a sensor holder, particularly in the form of a support fork with two support jaws between which the sensor is mounted. The foot serves the attachment to the construction machine and thus particularly preferably comprises a retention magnet. The foot can additionally preferably be used for bearing or even forming the alignment mark, for example, through a suitable shape of the foot, particularly with the help of a recess, a projection, etc. To enable a particularly precise alignment of the sensor, it is likewise preferable if the sensor holder has an adjustment device, with the help of which a fine adjustment of the position of the sensor is possible within the sensor holder with respect to the foot. This adjustment device is ideally configured such that the sensor is adjustable about at least one spatial axis, preferably about a spatial axis oriented transversely and particularly perpendicularly to the foot plane. A particularly strong and functionally reliable adjustment device is obtained, for example, through suitable, particularly curved, elongated-hole guides, particularly within the support jaws.

The aforesaid object of the present invention is further achieved by a method for the magnetic quick-mounting of an attachment device, particularly a sensor and very particularly a camera, to a construction machine, particularly a road paver and/or a road milling machine, comprising the steps of: attaching a positioning mark with an alignment aid to the construction machine; attaching an alignment mark to the attachment device; magnetically attaching the attachment device to the positioning mark; and aligning the attachment device based on the relative positions of the alignment aid and the alignment mark. To avoid repetitions with respect to the individual elements, reference is made to the aforesaid, which also applies correspondingly for the method according to the present invention.

Once the positioning mark is attached to the construction machine and the alignment mark is attached to the attachment device (which may already occur during the manufacturing of the machine or by means of an alignment mark firmly implemented in a foot), these steps do not need to be repeated unless the attachment device is to be used at a location other than that of the first positioning mark. The positioning mark remains on the construction machine, the alignment mark remains on the attachment device or is an integral component thereof. Only the mounting and the alignment of the attachment device are repeated in the daily work process.

The method may further be supplemented by an additional step of mounting a detachable reference mark on the alignment aid, which marks the alignment of the attachment device relative to the construction machine. The reference mark is used when an existing alignment of the attachment device needs to be marked for future restoration. After the original alignment has been restored, the reference mark can be removed. It is also possible to leave the reference mark if it is conceivable that the attachment device will be readjusted or removed in the future and then needs to be returned to the marked alignment.

An additional optional step is the attachment of a respective allocation aid to the attachment device and to the positioning mark, which enable the allocation of the attachment device to the positioning mark. If the allocation of different attachment devices to the positioning marks needs to be changed, the respective allocation aids can be exchanged.

The aforesaid object is further achieved with a construction machine, particularly a road paver, a road milling machine, a stabilizer, a recycler or a landfill compactor, having at least one magnetic quick mounting unit according to the present invention.

BRIEF DESCRIPTION OF THE DRAWINGS

The present invention is explained in further detail below based on the exemplary embodiments shown in the figures. In the schematic figures:

FIG. 1 is a side view of a construction machine, in this case a road paver;

FIG. 2 is a front view of an attachment device, in this case a camera;

FIG. 3 is a top view of an attachment device, in this case a camera;

FIG. 6 is a top view according to FIG. 5 with reference mark;

FIG. 7 is a top view according to FIG. 4 with reference mark;

DETAILED DESCRIPTION OF THE INVENTION

Figure 4:
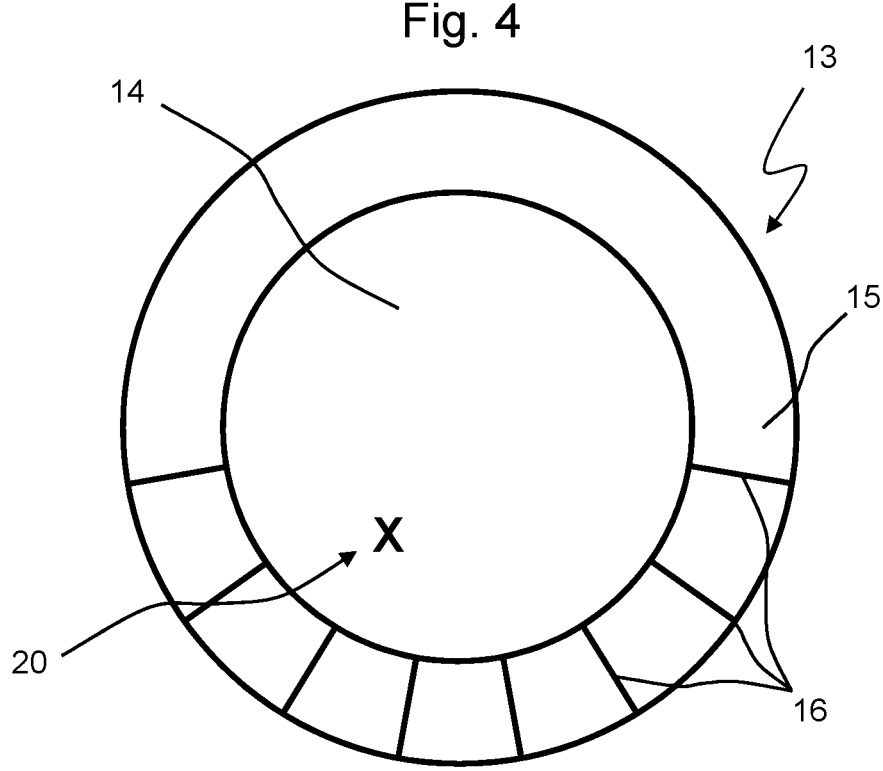
FIG. 4 is a top view of a positioning mark.

FIG. 1 shows a construction machine, specifically a road paver 1 on which the present invention is used. The road paver 1 has an operator platform 2 with a control panel via which an operator can control road paver 1. A drive unit 3 provides the necessary energy for operation and propulsion of the road paver 1. The road paver 1 has travelling devices 6 and is self-propelled. During operation, paving material is transported from a bunker 5 through the road paver 1 to a paving screed 4, which distributes and compacts the paving material and leaves it on the ground as a new base layer of a road. To monitor these processes, a magnetic quick mounting unit according to the present invention is used, which is described in further detail below. In addition, an attachment device 7 in the form of a camera having a field of vision 11 is mounted to the road paver. It is mounted by means of a magnetic quick mounting unit 17.

FIGS. 2 and 3 show an attachment device 7, which is a camera in the example depicted. It has a foot 8 and a head 9. A lens 10 is located at the head 9 of the camera, from which the field of vision 11 of the camera spans having the angle of vision α. The direction in which the field of vision 11 of the camera is pointed is also referred to as the operational direction of the attachment device 7, i.e., the camera. The foot 8 of the camera has a mounting magnet M and a mounting side 19, with which the attachment device 7 can be mounted to the construction machine, for example, to road paver 1. An alignment mark 12, in this case a weatherproof sticker, is attached to the foot 8 of the camera. Here, for example, additional or alternative types of marking, such as notches, projections, etc. can be used as well.

The alignment mark 12 is configured and attached in such a manner that the angle of vision α and the path of the field of vision 11 can be read on it. In particular, FIG. 3 demonstrates that the alignment mark 12 essentially precisely shows or marks the field of vision 11 of the camera in a top view. In the example shown, the alignment mark 12 is designed in the form of a circular ring segment, the narrow sides of which are adapted to the path of the field of vision 11. However, the alignment mark 12 could also be shaped differently as long as the path of field of vision 11 can be easily read. To better visually highlight the display, the alignment mark 12 can be designed in a signal color, for example, red. Due to the alignment mark 12, the operational or viewing direction of the attachment device 7 is always immediately visible.

FIG. 4 shows a positioning mark 13, which may be attached to virtually any spot on the construction machine ready for application. Where the positioning mark 13 is attached depends on the respective application. In the present exemplary embodiment, the positioning mark 13 comprises a contact surface 14 and an alignment aid 15. In the example shown, the alignment aid 15 extends in the shape of a circular ring around the contact surface 14 and surrounds it completely. Of course, the alignment aid 15 may have other shapes, for example, a rectangular or polygonal shape. The contact surface 14 and the positioning mark 13 may also have different shapes and do not have to be circular as depicted. What is important is that the positioning mark 13 with the alignment aid 15 enables an exact positioning of the attachment device with the help of the alignment mark attached thereon. The contact surface 14 is configured in such a manner that the mounting side 19 of the foot 8 of the camera fits entirely on the contact surface 14 and thus the alignment aid 15 next to the foot 8 continues to remain visible when the camera (see FIG. 5) has been mounted on the positioning mark 13 on the contact surface 14. The alignment aid 15 is provided with a consistent scale 16, which is likewise not covered by the foot 8 as illustrated in FIG. 5, but rather sticks out and is thus visible from outside.

Figure 5:
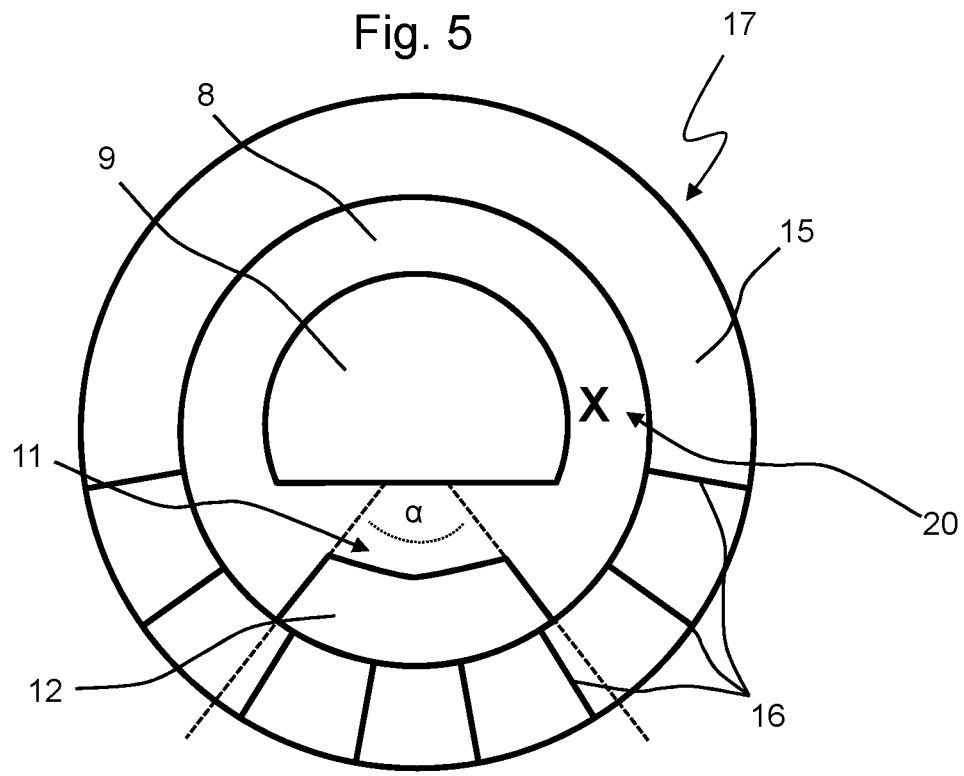
FIG. 5 is a top view of a positioning mark with attachment device.

As can be taken from a synopsis of FIGS. 4 and 5, both the positioning mark 13 and the attachment device 7 comprise an allocation aid 20, the corresponding symbol "X" in the example shown. Thus, the "X" symbolizes a specific position on the positioning mark for a specific attachment device. Deviating from the example depicted, the allocation aid 20 may also be arranged on other spots of the positioning mark 13 and the attachment device 7. For example, the allocation aid 20 may be attached to the alignment aid 15 or the head 9 as well. Due to the fact that both the attachment device 7 and the positioning mark 13 have identical an identical allocation aid 20, it is clear that this particular attachment device 7 should be attached at this positioning mark 13. If multiple attachment devices 7 are provided for the application on one and the same construction machine, the other pairs of attachment devices 7 and positioning marks 13 are marked with other allocation aids 20 different from those shown, for example, with "Y". This way, multiple attachment devices 7 can be used on one construction machine without slowing down the installation of the attachment devices 7.

The alignment of the attachment device 7 using the alignment aid 15 provided with scale 16 becomes clear particularly in FIG. 5, which shows the entire magnetic quick mounting unit 17. The field of vision 11 of the attachment device 7, which in the example shown is configured as a camera, is indicated by the alignment mark 12. When mounted, the alignment mark 12 is located directly next to the alignment aid 15 with the scale 16 and can therefore be compared with it. If the attachment device 7 needs to be rotated about a specific angle, the scale 16 of the alignment aid 15 can simply be used. If a level, or step, of scale 16 is, for example, 5° and the attachment device 7 needs to be turned by 10°, the alignment mark 12 is simply rotated by two levels of the scale 16.

Figure 8:
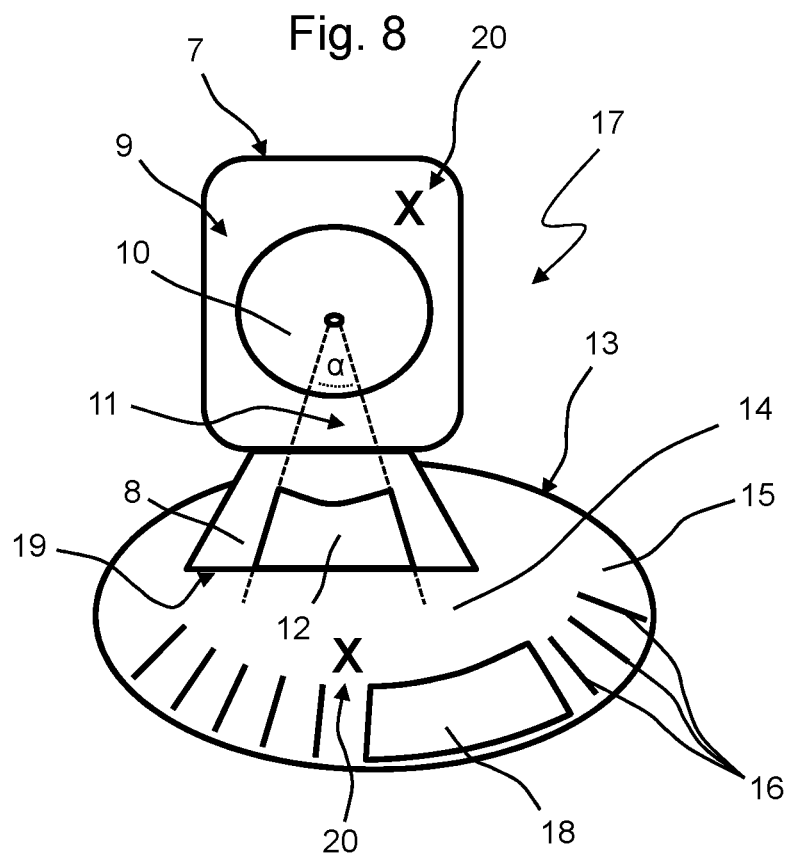
FIG. 8 is a perspective view of a positioning mark and an attachment device.

To ensure that an alignment of the attachment device 7 does not become lost if it is otherwise aligned or removed from the construction machine, a reference mark 18 is used as shown in FIGS. 6 through 8. In the shown exemplary embodiment, the reference mark 18 is configured as a magnetic component in the shape of a circular ring segment. The shape may, however, be selected differently as well, particularly adapted to the shape of the respective alignment aid 15 and/or alignment mark 12. What is important is that the reference mark 18 can be attached to the alignment aid 15 in such a manner that it clearly shows a position of the alignment mark 12. In the shown exemplary embodiment, the reference mark 18 is magnetically attached to the alignment aid 15 in such a way that it covers a part of the scale 16, which is therefore dashed in FIGS. 6 and 7 and not depicted at all in FIG. 8. FIG. 6 shows the situation in which the reference mark 18 has been applied on alignment mark 12 and attached to the alignment aid 15. Both the alignment mark 12 and the reference mark 18 precisely display the path of the field of vision 11 of the camera. FIG. 7 shows a situation after removal of the attachment device 7, i.e., the camera, from the positioning mark 13. The reference mark 18 remains on the alignment aid 15. If the camera needs to be mounted again later in the same alignment on the positioning mark 13, the alignment mark 12 of the camera merely needs to be realigned with the reference mark 18 in such a manner that both are located within the field of vision 11 of the camera. This is possible by simply aligning the alignment mark 12 with the reference mark 18. A situation where the camera is attached at the positioning mark 13 and aligned with the field of vision 11 is depicted in FIG. 8 in a perspective view.

Figure 9:
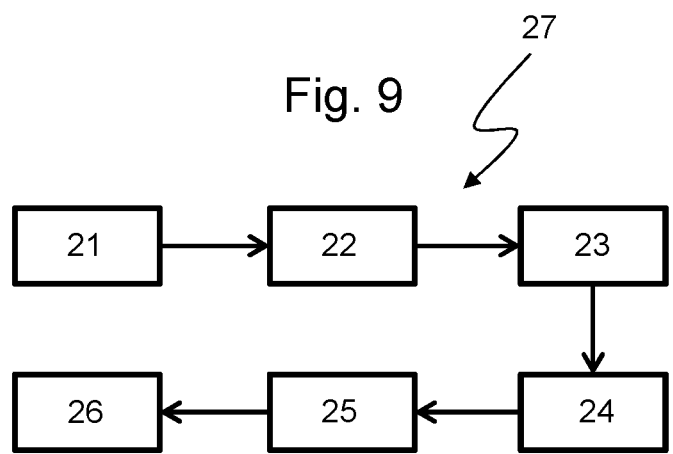
FIG. 9 is a flow chart of the method.

The method 27 for magnetic quick-mounting of an attachment device 7 is depicted in FIG. 9 as a flow chart. This method also comprises steps which have to be applied only once and thus also describes the approach when retrofitting the magnetic quick mounting unit of the present invention in existing systems. It begins with step 21, in which the positioning mark 13 is attached to the construction machine. The positioning mark 13 can be arranged at any location at which an attachment device 7 is needed. In the following step 22, the alignment mark 12 is attached to the attachment device 7 in such a way that the alignment mark 12 indicates the operational direction of the attachment device 7. In the following optional step 23, corresponding allocation aids 20 are attached to the positioning mark 13 and the attachment device 7 so that it is clearly identified which attachment device 7 belongs to which positioning mark 13. The attachment device 7 is then attached or mounted on the construction machine in step 24 of the method. This step is particularly simple due to the magnetic attachment, as the attachment device 7 essentially only needs to be positioned at the right spot, i.e., on the positioning mark 13. Step 25 follows, in which the attachment device 7 is aligned on the construction machine. To achieve this, the relative position of the alignment mark 12 to the alignment aid 15 or its scale 16 is used. In final step 26, the reference mark 18 is attached to the alignment aid 15. As long as the reference mark 18 remains on the alignment aid 15, the reference mark 18 and the alignment mark 12 can then be used for aligning the attachment device 7 in step 25; the alignment aid 15 and its scale 16 are no longer of concern.

Figure 10:
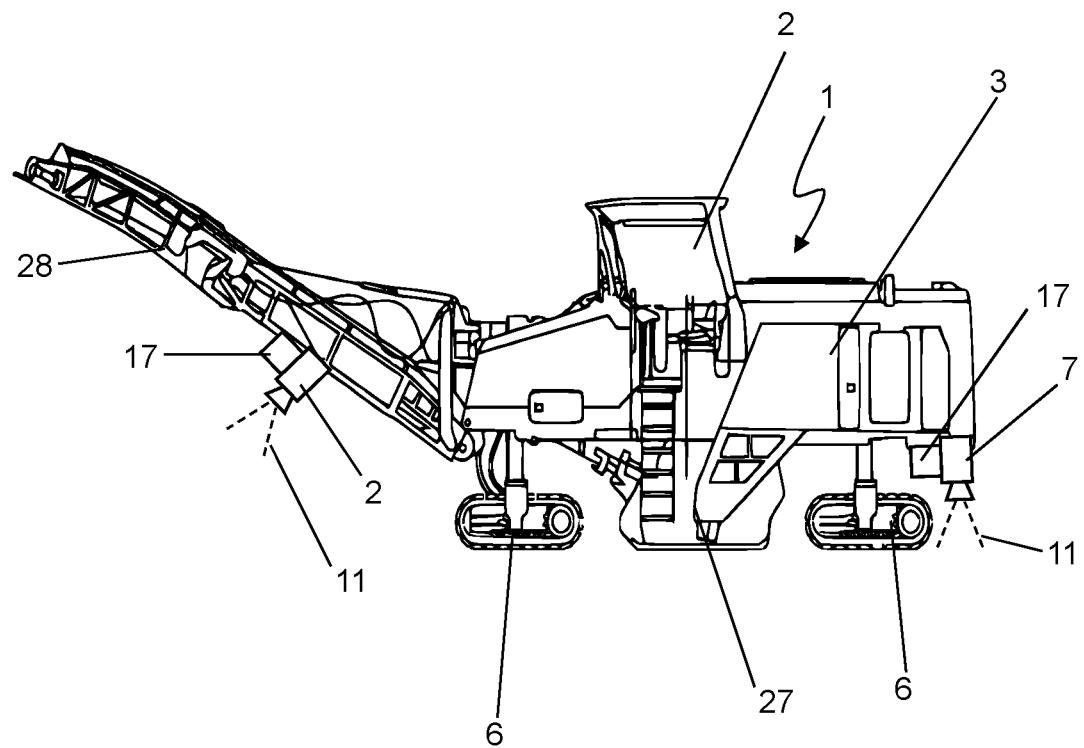
FIG. 10 is a side view of an alternative construction machine, in this case a road milling machine.

FIG. 10 illustrates an additional construction machine 1, specifically a road milling machine, which is particularly suited for the use of the present invention. In addition to travelling devices 6, an operator platform 2, and a drive motor 3, a milling unit 27 and a milled material conveyor device 28 are essential elements. In the present application, the construction machine 1 comprises two attachment devices 7 in the form of cameras. One camera is arranged underneath the milled material conveyor device 28. The other camera is arranged in the operational direction behind the milling unit 27 and its viewing direction is aimed at the ground.

Figure 11:
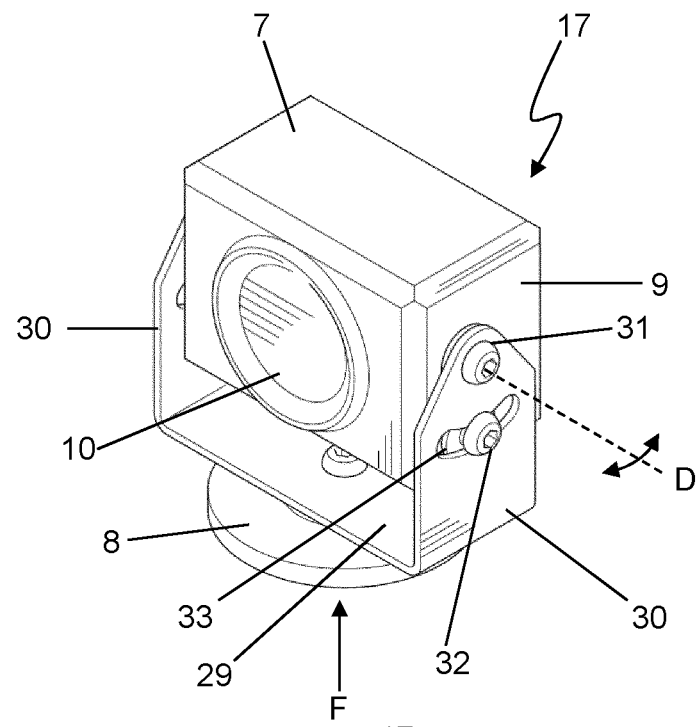
FIG. 11 is a perspective diagonal view of an additional alternative embodiment of an attachment device.
Figure 12:
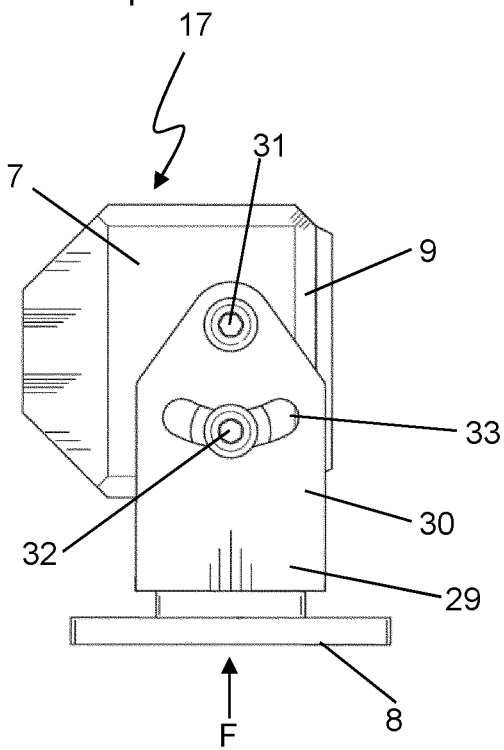
FIG. 12 is a side view of the attachment device of FIG. 11.

FIGS. 11 and 12 show another exemplary embodiment of an attachment device 7 of a magnetic quick mounting unit (17) (reference is made to the aforesaid with respect to the configuration of the alignment mark 12 and the alignment aid 15). The attachment device 7, which is likewise designed as a digital camera, comprises a foot 8 for holding the camera and a support fork 29 with two projecting support jaws 30, between which the camera is arranged. The attachment device can be adjusted in its relative position within a limited adjustment range for fine adjustment on the support jaws 30. For this, the fastening of the camera on the support jaws 30 comprises respectively two fastening screws 31 and 32 per jaw. The fastening screw 31 approaching from the outside forms the axis of a pivot joint connection between a respective support jaw 30 and the camera. The camera can be pivoted within the support jaws 30 relative to the foot 8 about the pivot joint axis D extending transversely and particularly perpendicularly to the support surface F. The adjustment range is limited in this case by the elongated-hole guide 33, which forms a slide guide device together with the fastening screw 32. The fastening screw 32 is guided, coming from the outside through the elongated hole 33, which, coaxially to the pivot joint axis D, is designed as a curve.

Figure 13:
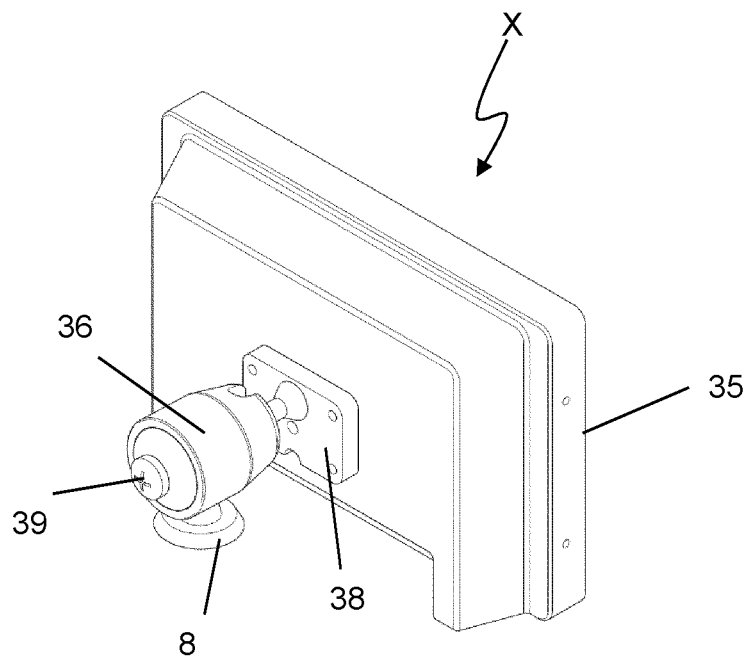
FIG. 13 is a perspective diagonal view from behind of a display device.
Figure 14:
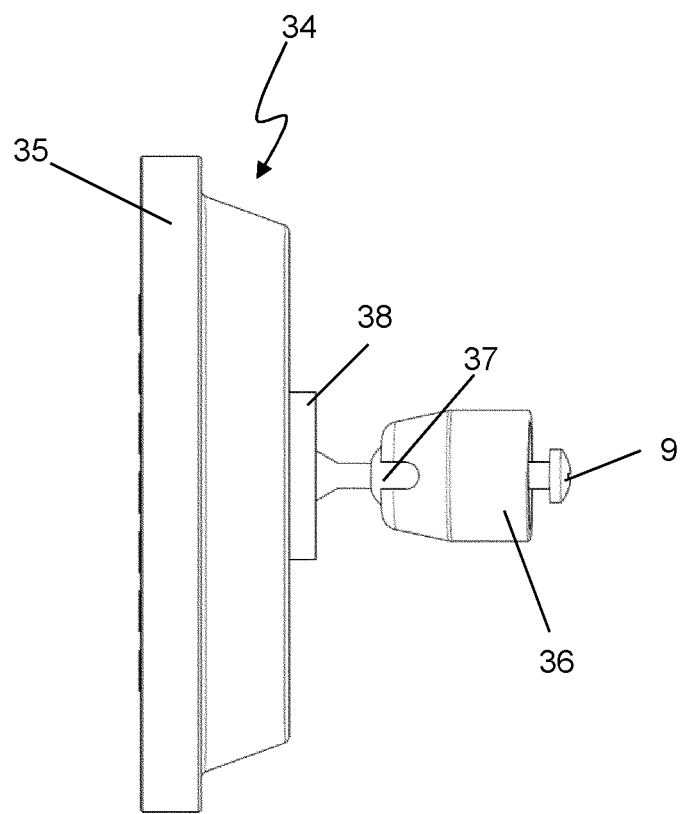
FIG. 14 is a side view of the display device of FIG. 13.

FIGS. 13 and 14 show a display holder 34, with which a display screen 35 can be arranged within the operator platform 2. Images taken by the camera can be displayed via the display screen 35, wherein the image can be transferred from the camera, for example, via cable or also wirelessly. The display screen can likewise be mounted with a quick mounting unit. In the specific exemplary embodiment, the holder additionally has a foot 8, a connection joint 36, as well as a holding plate 38 connected to the connection joint 36 via a ball joint 37, which holding plate in turns holds the display screen. A pressure screw is provided for locking the ball joint.

Figure 15:
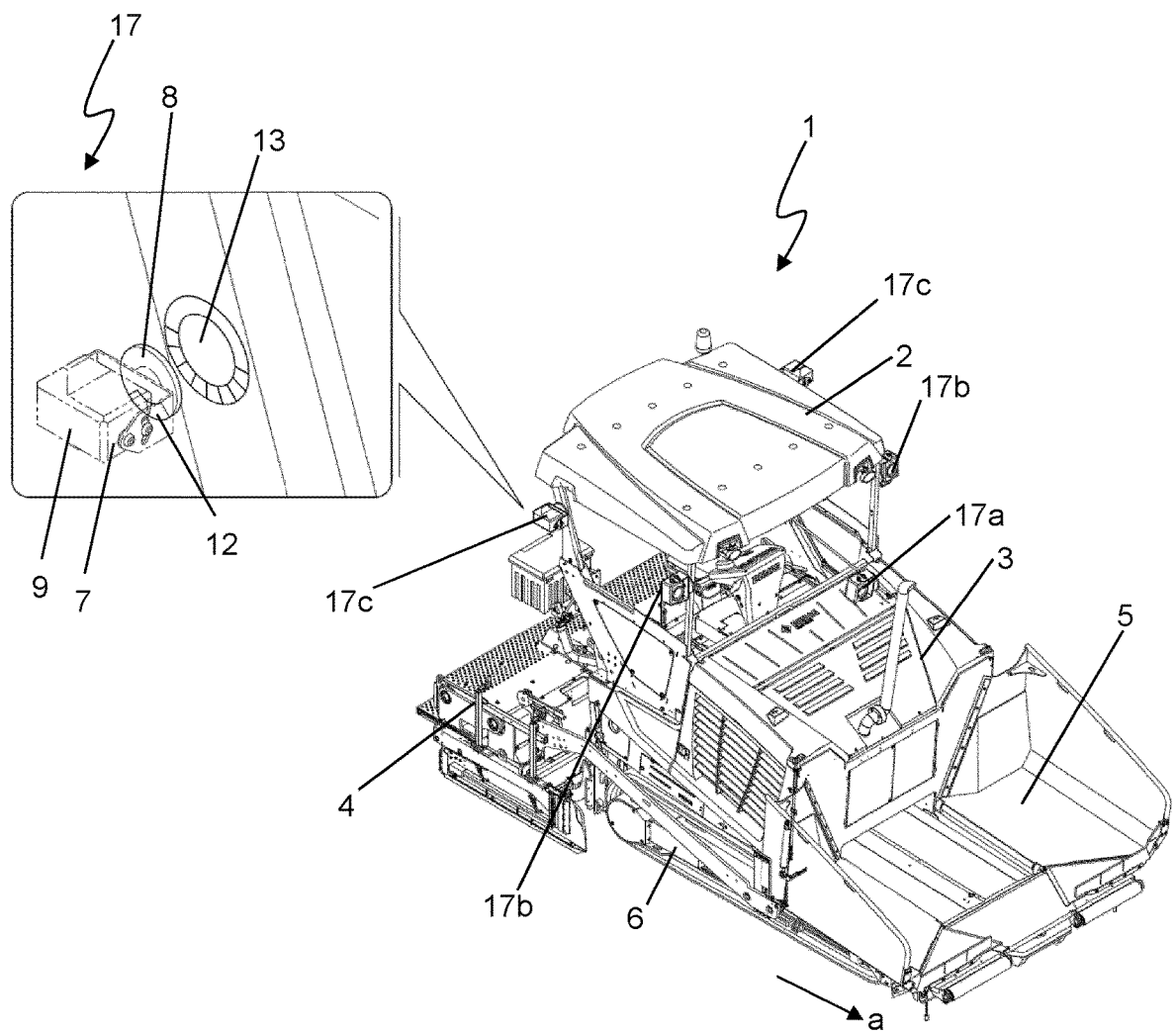
FIG. 15 is a perspective diagonal view of a road paver with multiple attachment devices of the type shown in FIGS. 11 and 12.

Based on a road paver finally, FIG. 15 illustrates various positions of cameras on the road paver, which may be used alternatively or even simultaneously through multiple cameras. The attachment occurs respectively via a quick mounting unit 17 according to the present invention. In this manner, for example, it is possible to arrange a camera (17a) for monitoring the fill level in the bunker and/or for monitoring the loading of paving material into the bunker in the area located in operational direction a in front of the operator platform 2 and behind the bunker 5. Additionally, or alternatively, one or more cameras (17b) may be arranged at a side of the operator platform with a viewing direction towards the front, particularly on the operator platform itself, in order to monitor the course of the road and/or the traffic with loading vehicles. Finally, it is still additionally or alternatively possible to also monitor particularly the side edge area of the road paver in front of the paving screed with cameras (17c) whose angle of vision is preferably directed primarily perpendicularly to the ground. These cameras 17(c) may be attached on the rear outside area of the operator platform. The aforesaid display device 34/35 may be arranged, for example, within the operator platform 2 and/or on lateral control platforms of the paving screed.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A magnetic quick mounting unit for a construction machine, comprising:
   a) a positioning mark configured for permanent attachment to a construction machine;
   b) an attachment device which can be magnetically attached on the positioning mark;
   c) an alignment mark which is arranged on the attachment device and which indicates the alignment of the attachment device; and
   d) an alignment aid arranged on the positioning mark, wherein the alignment mark and the alignment aid are configured such that the alignment of the attachment device relative to the construction machine can be read from the relative position of the alignment mark to the alignment aid when the attachment device has been attached on the positioning mark, and wherein the alignment aid comprises a scale via which various alignments of the attachment device can be adjusted during mounting.

2. The magnetic quick mounting unit according to claim 1, wherein the alignment aid surrounds a circumference of the attachment device mounted on the positioning mark by at least one third.

3. The magnetic quick mounting unit according to claim 1, wherein the magnetic quick mounting unit comprises a reference mark which can be detachably attached on the alignment aid, and with which a desired alignment of the attachment device relative to the construction machine can be marked.

4. The magnetic quick mounting unit according to claim 1, wherein the attachment device and the positioning mark comprise an allocation aid which enables the allocation of the attachment device to the positioning mark.

5. The magnetic quick mounting unit according to claim 1, wherein the attachment device is a sensor.

6. The magnetic quick mounting unit according to claim 1, wherein the positioning mark and/or the alignment mark is configured as a weatherproof sticker.

7. The magnetic quick mounting unit of claim 5, wherein the sensor comprises a camera.

8. A construction machine having a magnetic quick mounting unit according to claim 1.

9. The construction machine according to claim 8, wherein the construction machine comprises a road paver, a road milling machine, a stabilizer, a recycler, or a landfill compactor.

10. The magnetic quick mounting unit according to claim 1, wherein the construction machine comprises a road paver or a road milling machine.

11. The magnetic quick mounting unit according to claim 1, wherein the alignment aid surrounds a circumference of the attachment device mounted on the positioning mark by at least one half.

12. The magnetic quick mounting unit according to claim 1, wherein the alignment aid surrounds a circumference of the attachment device mounted on the positioning mark by at least two thirds.

13. The magnetic quick mounting unit according to claim 1, wherein the alignment aid surrounds a circumference of the attachment device mounted on the positioning mark completely.

14. A method for magnetic quick-mounting of an attachment device to a construction machine, comprising the steps of:
   a) attaching a positioning mark with an alignment aid on the construction machine;
   b) attaching an alignment mark on the attachment device;
   c) magnetically mounting the attachment device on the positioning mark; and
   d) aligning the attachment device via the relative positions of the alignment aid and the alignment mark, wherein the alignment aid comprises a scale via which various alignments of the attachment device can be adjusted during mounting.

15. The method according to claim 14, comprising: attaching a detachable reference mark, which marks the alignment of the attachment device relative to the construction machine, on the alignment aid.

16. The method according to claim 14, comprising: attaching a respective allocation aid on the attachment device and on the positioning mark, which enable the allocation of the attachment device to the positioning mark.

17. The method according to claim 14, wherein the attachment device comprises a camera.

18. The method according to claim 14, wherein the construction machine comprises a road paver.

* * * * *